Figure 2:
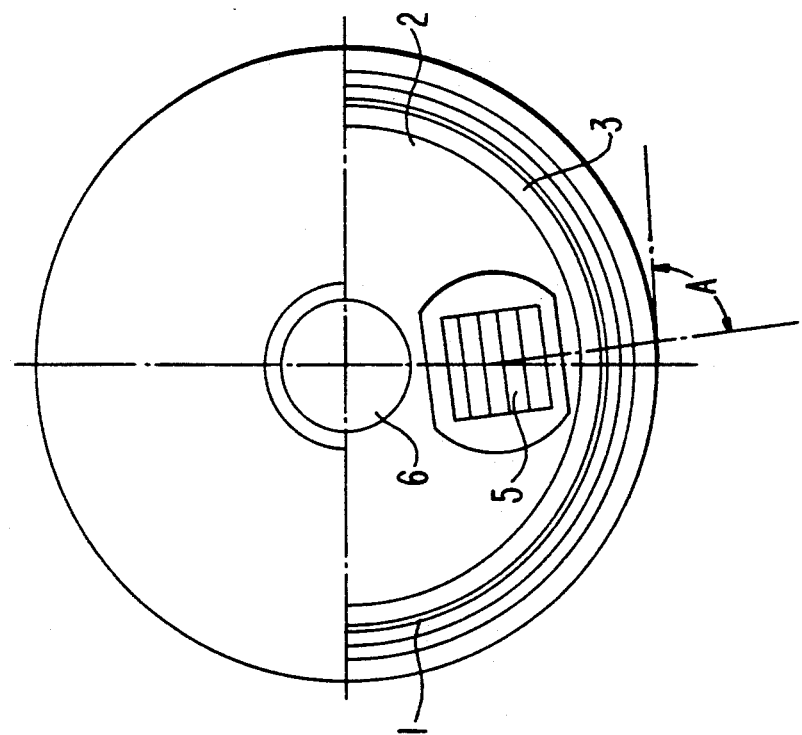

United States Patent [19]

Heieren

[11] Patent Number: 5,059,225
[45] Date of Patent: Oct. 22, 1991

[54] GAS PURIFYING CYCLONE

[76] Inventor: Erik V. Heieren, Nolzaus vei 9, N-3506 Royse, Norway

[21] Appl. No.: 295,032
[22] PCT Filed: May 6, 1988
[86] PCT No.: PCT/NO88/00039
§ 371 Date: Apr. 6, 1989
§ 102(e) Date: Apr. 6, 1989
[87] PCT Pub. No.: WO88/08740
PCT Pub. Date: Nov. 17, 1988

[30] Foreign Application Priority Data

May 7, 1987 [NO] Norway ................................ 871895

[51] Int. Cl.⁵ .............................................. B01D 53/24
[52] U.S. Cl. ........................................ 55/405; 55/406; 209/139.2; 209/144; 210/512.3
[58] Field of Search ................. 55/393, 404, 405, 406, 55/1, 394; 209/139.2, 144, 148, 156, 151; 210/512.3

[56] References Cited

U.S. PATENT DOCUMENTS 1,438,553 12/1922 Quam ..................................... 55/404
2,912,109 11/1959 Williams ............................... 209/148

Primary Examiner—Charles Hart
Attorney, Agent, or Firm—Banner, Birch, McKie & Beckett

[57] ABSTRACT

Gas purifying cyclone comprising at least one inlet nozzle (5) for contaminated gas, an outlet (6), for purified gas, an outlet (10) for contaminations, and a housing surrounding the rotor and comprising a funnel (9) at its lower most portion for receiving the contaminations, where a truncated cone shaped rotor (1) diverging downwardly being idly rotatable mounted coaxially with the funnel (9) thereby surrounding the nozzle or nozzles (5), a disc (2) being arranged rotatably with the rotor (1) under the nozzle (5) having a diameter which is smaller than the inner diameter of the rotor (1) at its lower end, thereby leaving open an annular passage (3) through which the contaminations may fall down from the rotating rotor (1) into the funnel (9), the nozzle or nozzles (5) thereby directing the gas flow substantially horizontally and in an acute angle (A) with a tangent in the point on the inner surface of the rotor (1) in which the gas flow impinges the rotor, the inclined direction of the gas flow in relation to the inner surface of the rotor (1) thereby forcing the rotor (1) to rotate by the friction forces between the rotor and the gas flow.

1 Claim, 1 Drawing Sheet

GAS PURIFYING CYCLONE

The present invention is related to a gas purifying cyclone comprising at least one inlet nozzle for contaminated gas, one outlet for air, one outlet for contaminations and a funnel accomodating of the contaminations.

Several principals are used for separating particles, such as dust, from contaminated gas. Well known is a system similar to vacuum cleaners where the gas is forced through a filter. Disadvantages by such a system are a relatively high price and inherent fire hazard. In another known system the gas is purified through water in so called scrubbers. A special embodiment of this system comprises several balls irrigated by water, where the gas is ascending through bed of balls and water afterwards is separated from the gas. Even here the price and space needed are disadvantages to be mentioned. Additionally the water in some cases may have to be purified.

Gas purifying systems also are known as cyclones where the contaminated gas flow is guided tangentially into a stationary cylinder and escaping centrally after the dust particles have been forced against the wall and collected in the bottom of the cylinder. The degree of efficiency is rather low by such systems.

The gas purifying cyclone according to the present invention provides a cyclone which drastically increases the degree of effect for cyclones provided with rotating impingement surfaces. This effect is achieved by the features defined in the characterizing clause of the claim.

In the gas purifying cyclone according to the present invention, a purifying effect of more than 95% is achieved by a very simple structural design and without external power supply. The flow of gas to be purified is as such used for rotating an inner rotor against which the gas flow impinges in such a way that the contamination is separated from the gas flow.

Figure 1:
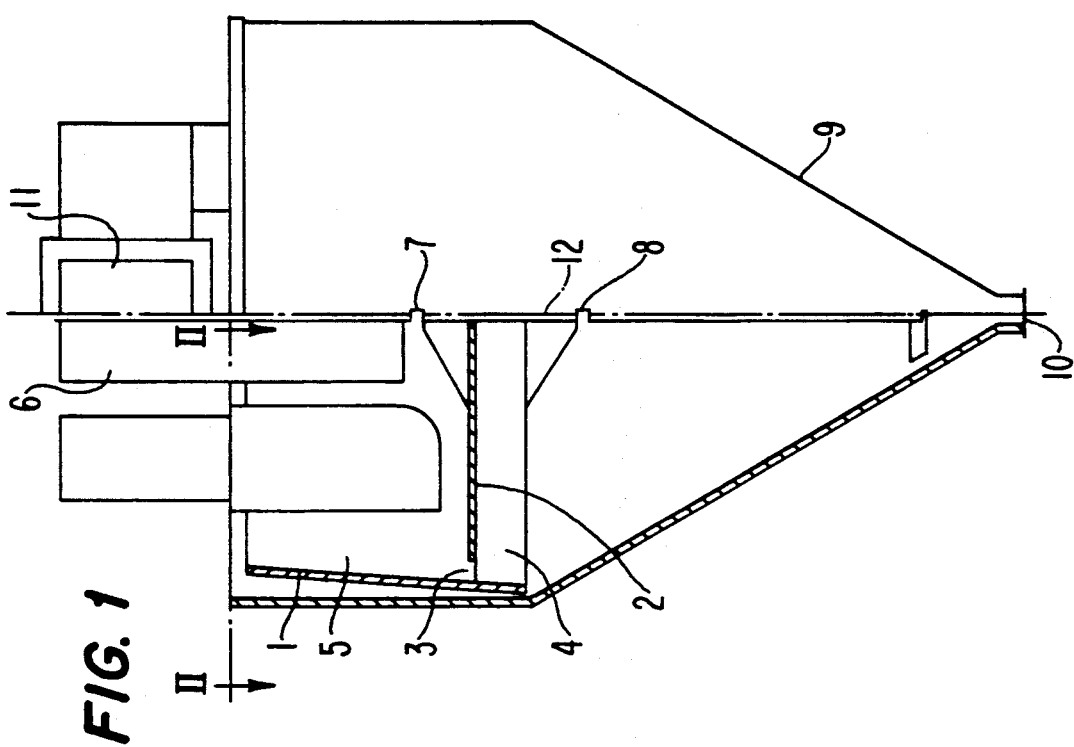

The advantages of the cyclone according to the present invention more clearly will be evident from the following description in connection with the drawing where FIG. 1 discloses a side view, partly in section, of the cyclone according to the invention and FIG. 2 discloses a top view of the cyclone in FIG. 1, partly as a cross section along II—II in FIG. 1.

FIG. 1 discloses the gas purifying cyclone according to the present invention, comprising a housing of which a lower part is a funnel 9 which at the lowermost end has an outlet 10 for discharging the separated contemiinations. The upper end of the housing is closed by a cover through which an outlet 6 is protuding coaxially with the housing. Through the cover furthermore a gas inlet is arranged, having in the interior of the housing a gas inlet nozzle 5 directing the gas flow into the housing substantially horizontally and in an acute angle A with the tangent in the point of impingement on the inner surface of a rotor 1 in the upper part of the housing. The rotor 1 provides a truncated cone secured rotatably to a shaft section 12 by means of radially arranged webs 4. The shaft section 12 is mounted to the central shaft with upper and lower bearings 7 and 8. A disc 2 covers most of the web radius exept for a annular passage 3 between the rotor 1 and the disc 2.

The cyclone may comprise one or two gas inlet nozzles 5. The contaminated gas thereby is supplied to a conduit 11 which may comprise a ventilator (not shown). The contaminated gas is flowing from the nozzle 5 substantially horizontally outwards in an angle to the inner surface of the rotor 1, as disclosed in FIG. 2. The angle A between the jet direction and a tangent in the impingement point may be adjusted according to the circumstances, such as type of contamination gas etc. An angle of approximately 45° has proved to give good results.

The gas jet from the nozzle 5 will rotate the rotor 1 and the contaminations impinging against the inner surface of the rotor which have its diverging end directed downwardly, will be separated from the gas flow and fall through the annular passage 3 down to the funnel 9, assisted by the centrifugal force.

With the gas purifying cyclone according to the present invention a purifying degree of more than 95% is achieved by a suitable choice of the angle A, the apex angle of the truncated cone shaped rotor 1 and the dimentions of the rotor, the annular passage 3 and the disc 2 in relation to the gas flow rate.

I claim:

1. Gas purifying cyclone comprising at least one inlet nozzle (5) for contaminated gas, an outlet (6) for purified gas, an outlet (10) for contaminations, and a housing surrounding a rotor and comprising a funnel (9) at its lowermost portion for receiving the contaminations, characterized in a truncated cone shaped rotor (1) diverging downwardly, being idly rotateable mounted coaxially with the funnel (9) thereby surrounding the nozzle or nozzles (5), a disc (2) being arranged rotateably with the rotor (1) under the nozzle (5) having a diameter which is smaller than the inner diameter of the rotor (1) at its lower end, thereby leaving open an annular passage (3) through which the contaminations may fall down from the rotating rotor (1) into the funnel (9), the nozzle or nozzles (5) thereby directing the gas flow substantially horizontally and in an acute angle (A) with a tangent in the point on the inner surface of the rotor (1) in which the gas flow impinges the rotor, the inclined direction of the gas flow in relation to the inner surface of the rotor (1) thereby forcing the rotor (1) to rotate by the friction forces between the rotor and the gas flow.

* * * * *